United States Patent [19]

Wada et al.

[11] Patent Number: 5,076,384
[45] Date of Patent: Dec. 31, 1991

[54] ULTRASONIC OBSTACLE SENSOR

[75] Inventors: Shunichi Wada; Masayuki Yano, both of Himeji, Japan

[73] Assignee: Mitsubishi Denki Kabushiki Kaisha, Tokyo, Japan

[21] Appl. No.: 597,480

[22] Filed: Oct. 15, 1990

[30] Foreign Application Priority Data

| Oct. 17, 1989 | [JP] | Japan | 1-268162 |
| Oct. 20, 1989 | [JP] | Japan | 1-271532 |
| Nov. 6, 1989 | [JP] | Japan | 1-287350 |
| Feb. 1, 1990 | [JP] | Japan | 2-20450 |

[51] Int. Cl.$^5$ .......................... B60Q 5/00; G08G 1/16
[52] U.S. Cl. ................................ 180/169; 307/525; 340/943; 364/424.01
[58] Field of Search ............... 180/168, 169; 340/435, 340/903, 943; 342/70, 72; 364/424.01, 424.02

[56] References Cited

U.S. PATENT DOCUMENTS

| 4,528,563 | 7/1985 | Takeuchi | 180/169 X |
| 4,600,215 | 7/1986 | Kuroki et al. | 180/169 X |
| 4,623,032 | 11/1986 | Kemmer | 180/169 |
| 4,833,469 | 5/1989 | David | 180/169 X |
| 4,849,731 | 7/1989 | Melocik | 340/904 X |

FOREIGN PATENT DOCUMENTS 2064484  3/1978  Fed. Rep. of Germany ...... 180/169
0152500  11/1979  Japan ................................. 340/943
0189573  11/1983  Japan ................................. 180/169
0205877  11/1983  Japan ................................. 180/169

OTHER PUBLICATIONS

Obstacle Avoidance with Ultrasonic Sensors (pp. 213-218), Borenstein et al, 1988.
Application Technology of Cooperative Laser Radar System for Automobiles on Expressways (pp. 76-78) publication date unknown.

Primary Examiner—Andres Kashnikow
Assistant Examiner—Brian L. Johnson
Attorney, Agent, or Firm—Sughrue, Mion, Zinn, Macpeak and Seas

[57] ABSTRACT

Ultrasonic waves are transmitted from an ultrasonic transmitter mounted on a vehicle towards a road surface. An ultrasonic receiver mounted on the vehicle receives ultrasonic waves reflected from the road surface and generates a signal which is amplified by an amplifier. The amplified signal is compared with a reference signal to detect components in the amplified signal due to obstacles on the road surface. The magnitude of the reference signal and/or the amplification factor of the amplifier is controlled to maintain a constant ratio between the average of the reference signal and the average of the amplified signal.

12 Claims, 14 Drawing Sheets

ULTRASONIC OBSTACLE SENSOR

BACKGROUND OF THE INVENTION

This invention relates to an ultrasonic obstacle sensor for use with an automotive vehicle. More particularly, it relates to an ultrasonic obstacle sensor for an automotive vehicle with an adjustable suspension which can adjust the hardness of the vehicle suspension when an obstacle, such as an object lying on a road or a pothole in the road surface, is detected so as to lessen the shock imparted by the obstacle to the passengers of the vehicle.

Various type of ultrasonic obstacle sensors for automobiles have been proposed in the past. For example, Japanese Published Examined Patent Application 1-30436 (1989) discloses a sensor for sensing obstacles around the body of a vehicle. Ultrasonic waves are transmitted to around the vehicle body, and based on the presence or absence of waves reflected back to the vehicle, it is determined whether an obstacle is present. In order to prevent reflected waves from a normal road surface on which the vehicle is travelling from being incorrectly sensed as reflected waves from obstacles, it is necessary either to increase the directionality of the ultrasonic receiver for receiving the reflected waves, or to transmit the ultrasonic waves substantially horizontally so that no waves will be reflected from the road surface. As a result, however, the reflected waves are not received well by the sensor, so accurate obstacle detection can not be performed.

Japanese Published Unexamined Patent Application No. 62-131813 discloses an ultrasonic sensor for sensing the road surface condition in front of a moving vehicle. In that application, an ultrasonic transmitter is mounted on a vehicle so as to continuously transmit ultrasonic waves diagonally forwards towards the road surface. However, the device of that application suffers from the following problems:

(1) Since the ultrasonic transmitter transmits continuously, the amount of heat generated by the transmitter can become very large. In order to prevent overheating, the ultrasonic wave energy must be suppressed to a low level, with the result that the waves reflected from the road surface are weak and difficult to detect.

(2) Due to the continuous transmission by the ultrasonic transmitter, interference occurs between the transmitted waves and the reflected waves, making it difficult to detect the reflected waves. Standing waves are also a problem. As a result, accurate obstacle detection can not be performed.

(3) Reflected waves from the road surface can not be differentiated from other reflected waves.

(4) Variation in the strength of reflected waves due to causes such as wind or temperature irregularities can not be distinguished from variation due to road surface irregularities.

Thus, at present, there is no device which can accurately detect obstacles such as potholes, rocks, and the like in or on the surface of a road on which a vehicle is travelling.

SUMMARY OF THE INVENTION

Accordingly, it is an object of the present invention to provide an ultrasonic obstacle sensor for an automotive vehicle which can accurately detect obstacles on the surface of a road on which the vehicle is travelling.

An ultrasonic obstacle sensor according to the present invention includes an ultrasonic transmitter for transmitting ultrasonic waves towards a road surface and an ultrasonic receiver for receiving ultrasonic waves reflected from the road surface or from obstacles in or on the road surface. The ultrasonic receiver generates an electrical signal corresponding to the received waves, and this signal is amplified by an amplifier. The amplified signal is compared by a comparator with a reference signal to generate an obstacle detection signal indicating when the amplified signal exceeds the reference signal, and thereby indicating the presence of an obstacle on the road surface. At least one of the magnitude of the reference signal and the amplification factor of the amplifier is varied in accordance with changes in the average value of the amplified signal.

In preferred embodiments, the magnitude of the reference signal or the amplification factor of the amplifier is controlled so that the ratio of the average value of the amplified signal to the average value of the reference signal is constant. As a result, variations in the strength of the ultrasonic waves reflected from the road surface are automatically compensated for, and components in the reflected waves due to obstacles in or on the road surface can be accurately detected.

In preferred embodiments, the ultrasonic waves are generated intermittently by the ultrasonic transmitter. Intermittent transmission has the advantage over continuous transmission that the heat dissipation by the ultrasonic transmitter is less than for continuous transmission, so there is less danger of the transmitter overheating. However, in the present invention, it is also possible to perform continual transmission of ultrasonic waves.

DESCRIPTION OF THE PREFERRED EMBODIMENTS

Figure 1:
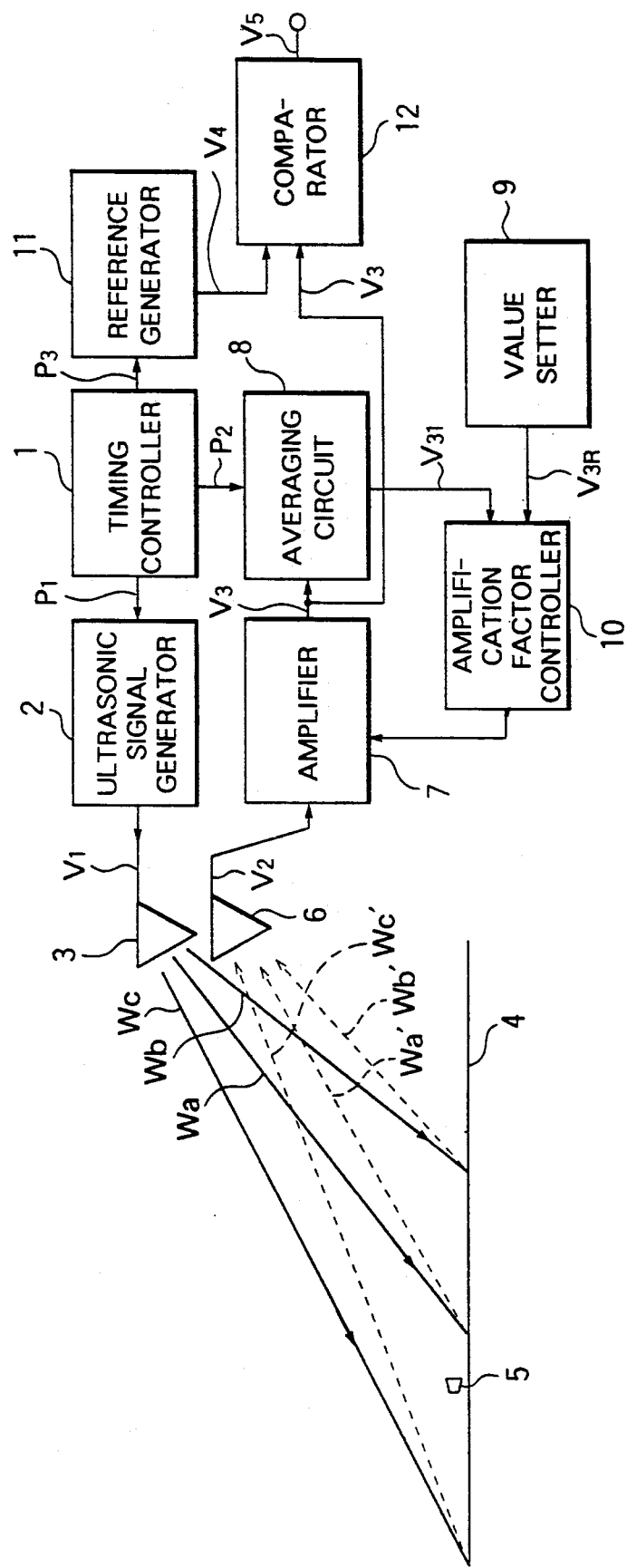
FIG. 1 is a block diagram of a first embodiment of an obstacle sensor according to the present invention.

A number of preferred embodiments of an ultrasonic obstacle sensor according to the present invention will now be described while referring to the accompanying drawings. FIG. 1 is a block diagram of a first embodiment. As shown in this figure, a timing controller 1 generates control signals $P_1$-$P_3$ at prescribed intervals. Control signal $P_1$ is input to an ultrasonic signal generator 2, which in response intermittently generates ultrasonic signals $V_1$ having a prescribed timing, voltage, and frequency. The ultrasonic signals $V_1$ drive an ultrasonic transmitter 3, which intermittently transmits ultrasonic waves. The waves emitted from the ultrasonic transmitter 3 generally define a cone. $W_b$ indicates the shortest path travelled by waves in the cone between the transmitter 3 and the road surface 4, $W_c$ indicates the longest path travelled by waves in the cone, and $W_a$ indicates the path of average distance travelled by the waves in the cone. The transmitter 3 is mounted on a suitable member, such as a bumper, on the front of an unillustrated automotive vehicle and is oriented so that the ultrasonic waves are directed diagonally forwards towards the road surface 4 on which the vehicle is travelling. When the transmitted ultrasonic waves strike the road surface 4 or an obstacle 5 on the road surface 4, they return to the vehicle as reflected waves, which are received by an ultrasonic receiver 6 mounted on the vehicle adjoining the transmitter 3. $W_b$ indicates the shortest path travelled by the reflected waves between the road surface 4 and the receiver 6, $W_c$ indicates the longest path travelled by the reflected waves, and $W_a$ indicates the path of average distance travelled by the reflected waves. The transmitter 3 and the receiver 6 can both be in the form of ultrasonic microphones.

The ultrasonic receiver 6 generates a received signal $V_2$ corresponding to the reflected waves, and this signal $V_2$ is input to an amplification circuit 7 which performs signal processing and amplification. The amplification factor of the amplification circuit 7 can be adjusted by an amplification factor controller 10 connected to the amplification circuit 7. An amplified and processed signal $V_3$ from the amplification circuit 7 is input to an averaging circuit 8. In response to a control signal $P_2$ from the timing controller 1, the averaging circuit 8 generates an average signal $V_{31}$ indicating the average of signal $V_3$.

The average signal $V_{31}$ is input to the amplification factor controller 10. A predetermined reference signal $V_{3R}$ from a reference value setter 9 is also input to the amplification factor controller 10. The amplification factor controller 10 compares the average signal $V_{31}$ with the reference signal $V_{3R}$ and adjusts the amplification factor of the amplification circuit 7 so that the average signal $V_{31}$ will match the reference signal $V_{3R}$. The averaging circuit 8 and the amplification factor controller 10 form a feedback loop for the amplification circuit 7 so that the amplified signal $V_3$ will have a stable level.

The amplified signal $V_3$ is also input to a comparator 12, which can comprise an op-amp, for example. A reference signal $V_4$ is also input to the comparator 12 by a reference signal generator 11 in response to control signal $P_3$ from the timing controller 1. The comparator 12 compares signals $V_3$ and $V_4$ and generates an obstacle detection signal $V_5$ based on the result of the comparison. In the present embodiment, the obstacle detection signal $V_5$ has a high level to indicate the presence of an obstacle when the amplified signal $V_3$ exceeds the reference signal $V_4$.

The obstacle detection signal $V_5$ can be used by an unillustrated suspension controller which adjusts the stiffness of the suspension of the vehicle when signal $V_5$ indicates the presence of an obstacle 5. By adjusting the suspension hardness, the suspension controller can decrease the shock imparted to the passengers of the vehicle when the vehicle travels over the obstacle.

Figure 2:
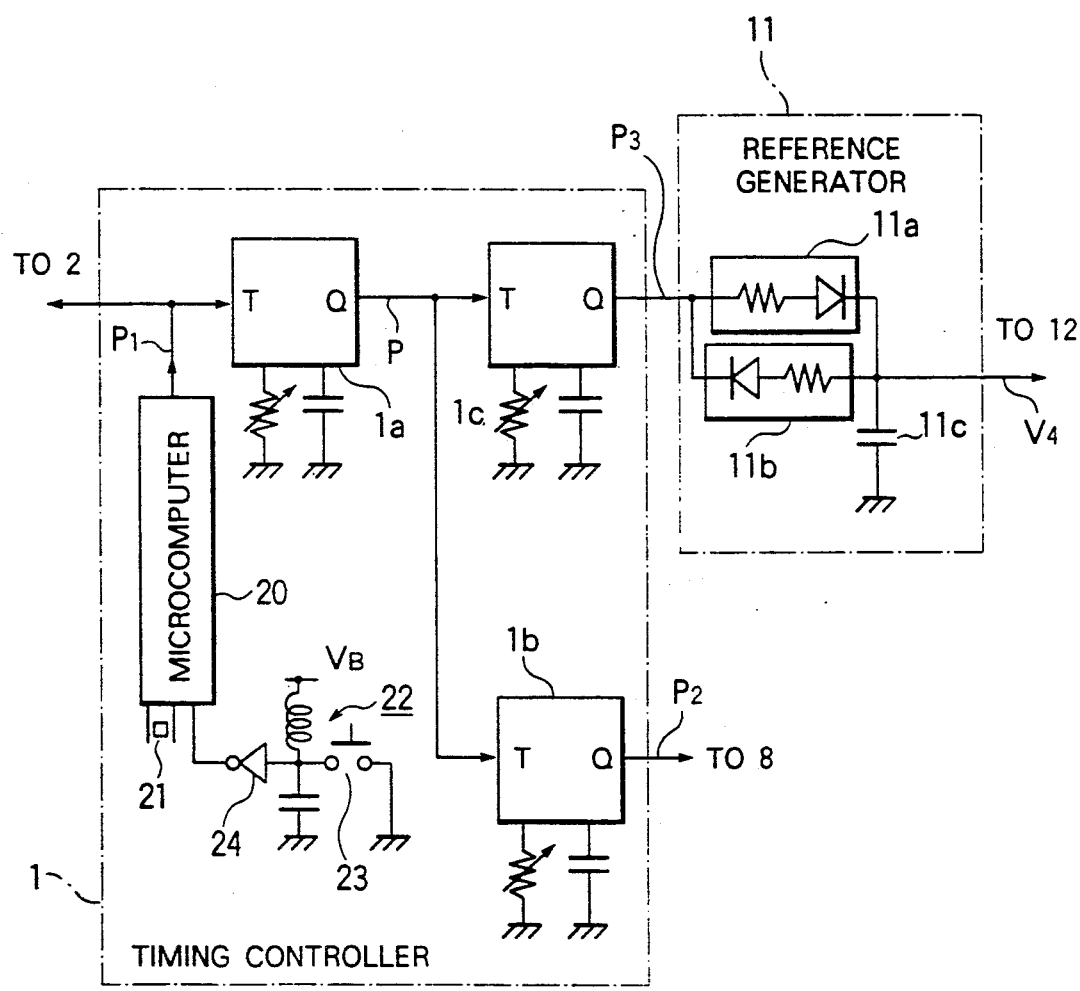
FIG. 2 is a circuit diagram of the timing controller and the reference signal generator of FIG. 1.

FIG. 2 is a circuit diagram of an example of the timing controller 1 and the reference signal generator 11. The timing controller 1 includes a programmable timer housed in a microcomputer 20 such as a Hitachi Model HD63B01Y. Alternatively, a commercially available timer IC can be used instead of a microcomputer 20. The microcomputer 20 is connected to a crystal oscillator 21 and a starting circuit 22.

The starting circuit 22 includes an automatically resetting normally-open starting switch 23 disposed in the vicinity of the driver's seat of the vehicle and a wave shaping circuit 24 connected to the switch 23. When the starting switch 23 is temporarily closed, it generates a low level signal. The wave shaping circuit 24 inverts the low level signal and outputs the inverted signal to the microcomputer 20 as a starting signal.

The microcomputer 20 is driven by an unillustrated dc power supply. Based on the oscillations of the crystal oscillator 21, the microcomputer 20 generates a series of clock signals. In response to each clock signal, a previously stored program is executed, and pulse-shaped control signals $P_1$ are output by the microcomputer 20.

Control signal $P_1$ is input to a first monostable multivibrator 1a as a clock signal. The first monostable multivibrator 1a generates an output signal P, which is input to a second monostable multivibrator 1b and a third monostable multivibrator 1c as a clock signal. Monostable multivibrators 1b and 1c respectively output second control signal $P_2$ and third control signal $P_3$. The pulse length of each of signals P, $P_2$, and $P_3$ can be set by appropriately selecting the values of the capacitor and resistor associated with each monostable multivibrator 1a-1c.

The reference signal generator 11 includes a charging circuit 11a and a discharging circuit 11b connected in parallel between the third monostable multivibrator 1c and a grounded capacitor 11c. Each of circuits 11a and 11b comprises a resistor and a diode connected in series, with the polarity of the diode in charging circuit 11a being opposite of the polarity of the diode in discharging circuit 11b. The charging circuit 11a and capacitor 11c form a first reference signal generating circuit for generating a monotonically increasing reference wave form starting when control signal $P_3$ changes from a low level to a high level. The discharging circuit 11b and capacitor 11c form a second reference signal generating circuit for generating a monotonically decreasing reference wave form staring when control signal $P_3$ changes from a high level to a low level. The voltage across capacitor 11c is output to the comparator as reference signal $V_4$.

Figure 3:
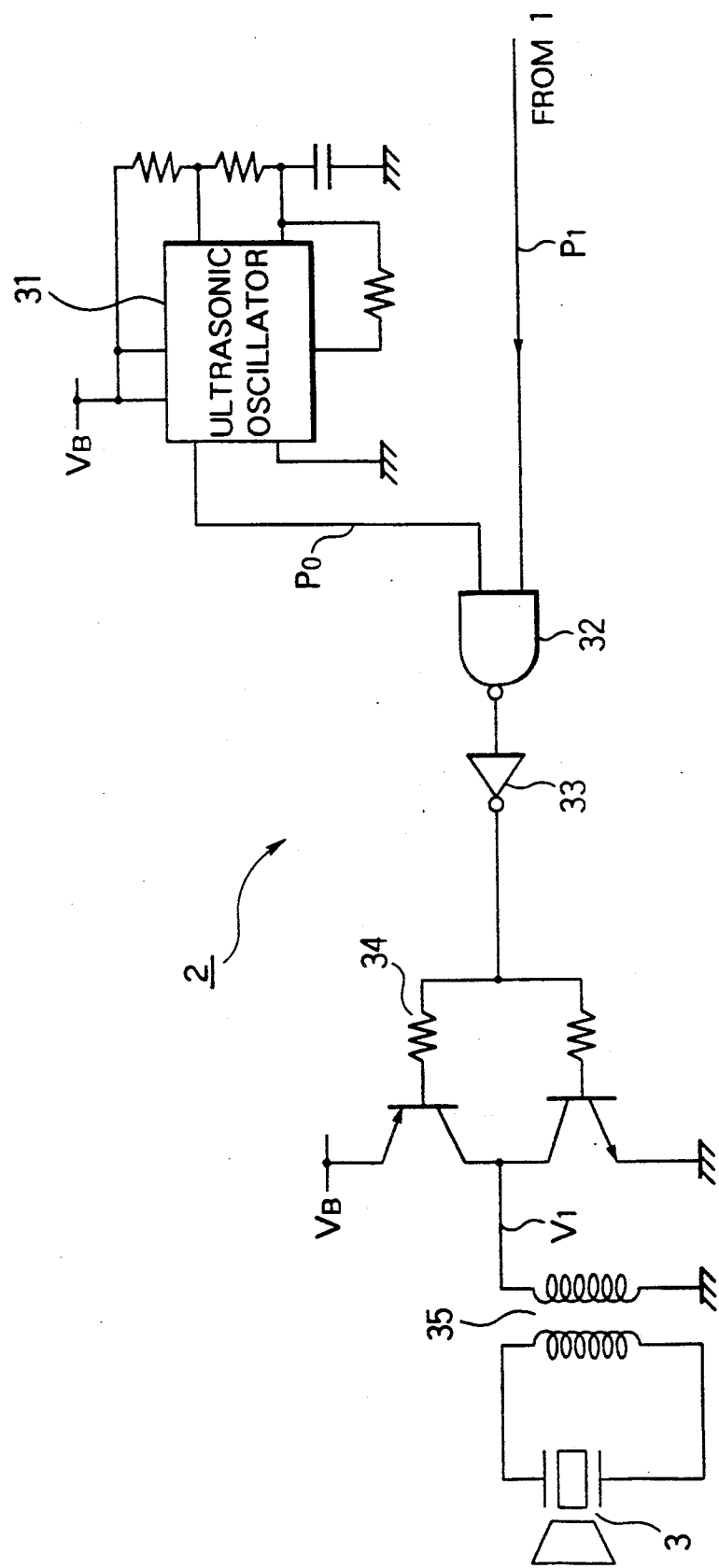
FIG. 3 is a circuit diagram of the ultrasonic signal generator of FIG. 1.

FIG. 3 is a circuit diagram of an example of the ultrasonic signal generator 2. It includes an ultrasonic oscillator 31 which generates pulses $P_0$ having a prescribed ultrasonic frequency. The pulses are input to one input terminal of a NAND gate 32, and control signal $P_1$ from the timing controller 1 is input to the other input terminal. The output of the NAND gate 32 is inverted by an inverter 33 and amplified by an amplifier 34 to obtain ultrasonic signal $V_1$. The voltage of signal $V_1$ is increased by a step-up transformer 35, and the strengthened signal is applied to the ultrasonic transmitter 3. With this arrangement, the transmitter 3 transmits ultrasonic waves intermittently (only when control signal $P_1$ has a high level) rather than continuously, so the amount of heat generated by the ultrasonic transmitter 3 can be suppressed without having to limit the energy of the transmitted ultrasonic waves to a low level.

Figure 4:
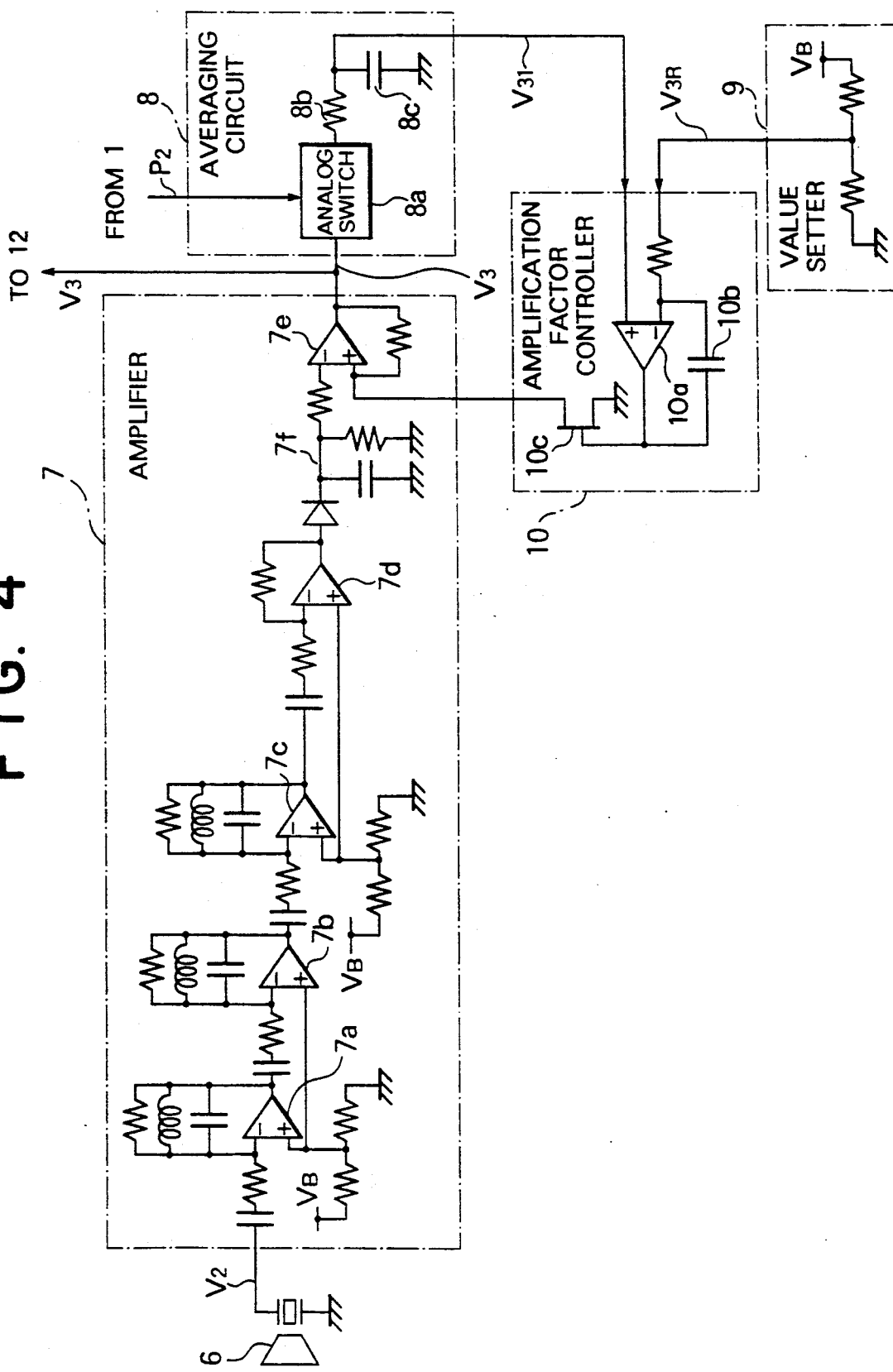
FIG. 4 is a circuit diagram of the amplification circuit, the averaging circuit, the value setter, and the amplification factor controller of FIG. 1.

FIG. 4 is a circuit diagram of an example of the amplification circuit 7, the averaging circuit 8, the value setter 9, and the amplification factor controller 10.

The amplification circuit 7 includes a plurality of stages of amplifiers 7a-7e connected in series. In the present embodiment, there are five stages of amplifiers, but the number of stages is not critical. The amplification factor of the fifth-stage amplifier 7e can be varied. A peak detector 7f for performing demodulation of AM waves is installed between the fourth-stage amplifier 7d and the fifth-stage amplifier 7e.

The output signal $V_3$ of the fifth-stage amplifier 7e is input to the averaging circuit 8. The average circuit 8 includes an analog switch 8a for sampling the amplified signal $V_3$ in response to control signal $P_2$ and an averaging and hold circuit comprising a resistor 8b and a capacitor 8c for averaging the output of the analog switch 8a and generating an average signal $V_{31}$.

The value setter 9 can be any device for generating a signal having a prescribed voltage, such as a voltage divider formed by two resistors 9a and 9b connected in series between a voltage supply $V_B$ and ground. The voltage at the junction of the two resistors 9a and 9b is used as a reference signal $V_{3R}$.

The amplification factor controller 10 includes an op-amp 10a which compares the average signal $V_{31}$ from the averaging circuit 8 with the reference signal $V_{3R}$ from the value setting circuit 9. A capacitor 10b is connected between the inverting input terminal and the output terminal of the op-amp 10a. The output terminal of the op-amp 10a is connected to the gate of an FET 10c. The other two terminals of the FET 10c are connected to the inverting input terminal of the fifth-stage amplifier 7e of the amplification circuit 7 and to ground, respectively. The output of op-amp 10a controls the current flowing through the FET 10c and therefore the amplification factor of the fifth-stage amplifier 7e.

Figure 5:
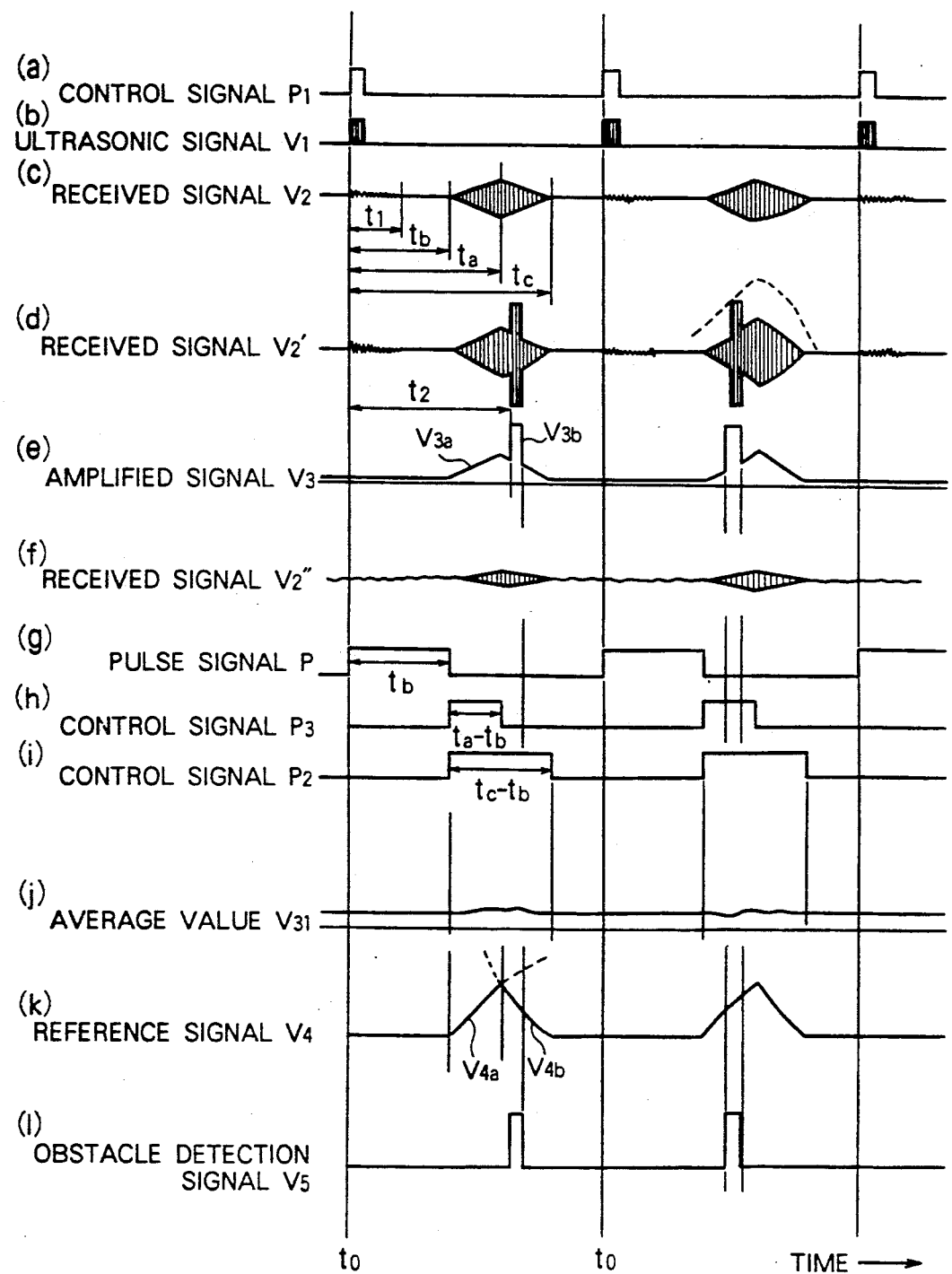
FIG. 5 is a wave form diagram for explaining the operation of the embodiment of FIG. 1.

FIG. 5 is a wave form diagram of the output signals of various portions of the embodiment of FIG. 1. As shown by line 5(a), the timing controller periodically generates control signal $P_1$. As shown by line 5(b), during the period that control signal $P_1$ has a high output level, the ultrasonic signal generator 2 generates an ultrasonic signal $V_1$ for driving the ultrasonic transmitter 3, which periodically transmits ultrasonic waves diagonally forwards towards the road surface 4.

The transmitted waves are reflected from the road surface 4 and return to the ultrasonic receiver 6 as reflected waves, and the ultrasonic receiver 6 generates a received signal $V_2$ indicative of the strength of the incoming reflected waves.

Line 5(c) illustrates the received signal $V_2$ when there is no obstacle 5 present on the road surface 4. Time $t_o$ corresponds to a rising edge of control signal $P_1$ and the start of transmission of the ultrasonic waves. From time $t_o$ until time t1, the received signal $V_2$ comprises noise due to transmitted waves reaching the receiver 6 and undesired reflected waves from the surroundings.

When time $t_b$ has elapsed, the reflected waves from the road surface 4 begin to reach the receiver 6. If the ultrasonic transmitter 3 and the ultrasonic receiver 6 are disposed next to each other and have nearly the same directionality, time $t_b$ corresponds to the round trip time of ultrasonic waves traveling along path ($W_b$, $W_b'$), which is the shortest path between the transmitter 3 and the receiver 6 via the road surface 4. Similarly, time $t_a$ corresponds to the round trip time of waves traveling along the path ($W_a$, $W_a'$) of average length, and time $t_c$ corresponds to the round trip time of ultrasonic waves traveling along path ($W_c$, $W_c'$), which is the longest path. If the lengths of paths $W_a$, $W_b$, and $W_c$ are respectively 1a, 1b, and 1c and the speed of sound is c, then times $t_a$-$t_c$ are as follows:

$$t_a = 2 1_a/c$$

$$t_b = 2 1_b/c$$

$$t_c = 2 1_c/c$$

Because of the directionality of the transmitter 3 and the receiver 6, the waves travelling along path ($W_a$, $W_a'$) are most strongly received by the receiver 6. Therefore, the received signal $V_2$ has a roughly triangular wave form which begins to rise at time $t_b$, reaches a maximum at time $t_a$, and becomes zero again at time $t_c$. The strength of the received signal $V_2$ depends upon the directionality of the transmitter 3 and the receiver 6 (which is determined by their characteristics and geometric disposition), the roughness of the road surface 4, and the directionality of the reflected waves.

If the height above the road surface 4 of the receiver 3 and the transmitter 6 and the speed of the vehicle remain constant, the magnitudes of $t_1$ and $t_a$-$t_c$ will remain constant each time the received signal $V_2$ is generated.

Line 5(d) of FIG. 5 illustrates the received signal $V_2'$ when a stationary obstacle 5 is present on the road surface 4. In this case, the received signal $V_2'$ includes a component due to the obstacle superimposed on the received signal $V_2$ due only to the road surface 4. In line 5(d), $t_2$ indicates the round trip time for waves travelling from the transmitter 3 to the obstacle 5 and back to the receiver 6. Since the vehicle is moving, the value $t_2$ is not constant. The obstacle 5 is first be struck by waves traveling along the path $W_c$, so time $t_2$ initially equals $t_c$. As the vehicle grows closer to the obstacle 5, the waves striking the obstacle 5 travel along shorter and shorter paths. Namely, although initially struck by waves travelling along path $W_c$, the obstacle 5 is subsequently struck by waves travelling along path $W_a$, and eventually it is struck by waves travelling along path $W_b$. Accordingly, as the vehicle approaches the magnitude of time $t_2$ changes from an initial value of $t_c$ to $t_a$ and finally to $t_b$, after which detection of the obstacle becomes impossible and the vehicle passes over the obstacle 5. At any time, the strength of the reflected waves from the obstacle 5 is roughly equal to the strength of the reflected waves from the road surface multiplied by a prescribed factor. Therefore, the peak path becomes a triangular wave form similar in shape to the received signal $V_2$ due to the reflected waves only from the road surface 4 (see the dashed line in line 5(d)).

Received signal $V'$ is amplified and demodulated by the amplification circuit 7 and becomes amplified signal $V_3$ as shown by line 5(e). When amplitude demodulation is performed, if the noise occurring between times t0 and t1 is masked, a signal for only the period $t_b$ to $t_c$ can be obtained.

When an obstacle 5 is present on the road surface 4, the amplified signal $V_3$ becomes the superposition of a wave component $V_{3a}$ due only to the road surface 4 and a wave component $V_{3b}$ due to the obstacle. Thus, $V_3$ can be expressed as $$V_3 = V_{3a} + V_{3b}.$$

The magnitude of the received signal $V_2$ depends on the smoothness of the road surface 4, which depends on the type of paving material of which the road surface 4 is made. When the road surface 4 is asphalt or other rough material, the received signal $V_2$ will have a fairly high level, but if the road surface 4 is a smooth material such as concrete, the received signal will have a much lower level, such as shown by received signal $V_2''$ in line 5(f). Even when the road surface 4 is made of asphalt, the received signal will have a low level when the vehicle is traveling at a high speed. This is because the Doppler effect produces an increase in the effective frequency of the reflected waves reaching the receiver 6, and the frequency response of the ultrasonic receiver 6 is such that its sensitivity decreases as the frequency of the incoming reflected waves increases.

Therefore, when the received signal has a low level like signal $V_2''$, the component of the received signal due to an obstacle 5 become small, so if the amplified signal $V_3$ is compared with a constant reference value, component $V_{3b}$ of the amplified signal $V_3$ due to the obstacle 5 can not be detected.

In order to overcome this problem, in the present embodiment, feedback control of the amplification factor of the amplification circuit 7 is carried out so that the magnitude of the amplified signal $V_3$ will always be great enough to detect components due to obstacle 5.

During the interval between successive control signals $P_1$, the timing controller 1 calculates the lengths of $t_a$, $t_b$, and $t_c$. The timing controller 1 sets the pulse width of pulse signal P to $t_b$, the pulse width of control signal $P_2$ to $t_c - t_b$, and the pulse width of control signal $P_3$ to $t_a - t_b$.

During the period that control signal $P_2$ has a high level, the analog switch 8a of the averaging circuit 8 is closed, so the averaging circuit 8 calculates the average value of the amplified signal $V_3$ and generates average signal $V_{31}$, as shown by line 5(j).

The op-amp 10a within the amplification factor controller 10 compares the average value signal $V_{31}$ with the reference signal $V_{3R}$ from the reference value setter 9 and controls the gate voltage of FET 10c such that the average value $V_{31}$ will match the reference value $V_{3R}$, regardless of the level of the received signal $V_2$. Therefore, even if the received signal has a very low level like signal $V_2''$, the amplification factor of the amplification circuit 7 is automatically adjusted so that the average value $V_{31}$ is maintained constant, and a stable amplified signal $V_3$ is input to the comparator 12.

Reference signal $V_4$ from the reference signal generator 11 comprises a first reference signal $V_{4a}$ and a second reference signal $V_{4b}$. The first reference signal $V_{4a}$ monotonically increases from time $t_b$ to time $t_a$, i.e., while control signal $P_3$ has a high level. The second reference signal $V_{4b}$ begins to monotonically decrease at time $t_a$ (when the level of control signal P falls), and it reaches a minimum value at time $t_c$. Thus, as shown by line 5(k), the reference signal $V_4$ formed by the first and second reference signals $V_{4a}$ and $V_{4b}$ has a triangular wave form similar to that of the amplified signal $V_3$. The values of the electrical components in the reference signal generator are set in advance to optimal values for obtaining the desired reference signal $V_4$.

The comparator 12 compares the reference signal $V_4$ with the amplified signal $V_3$, and as shown by line 5(1), it generates an obstacle detection signal $V_5$ having a high level whenever the amplified signal $V_3$ exceeds the reference signal $V_4$. In response to the level of obstacle detection signal $V_5$, the unillustrated suspension controller adjusts the hardness of the vehicle suspension.

As the present embodiment performs feedback control of the amplification factor of the amplification circuit 7, the average value signal $V_{31}$ is maintained constant even when the strength of the reflected waves from the road surface 4 varies due to changes in the vehicle speed or the smoothness of the road surface 4. Accordingly, a stable ratio is maintained between the average value of the amplified signal $V_3$ and the average value of the reference signal $V_4$. As a result, variations in the received signal $V_2'$ due to the presence of an obstacle 5 can be discriminated from variations due to other causes, and obstacle detection can be performed with accuracy.

Because the reference signal $V_4$ has a varying magnitude, and in particular a triangular wave form, the comparator 12 can more accurately detect components in the amplified signal $V_3$ due to obstacles 5 than if the reference signal $V_4$ had a constant value.

In the preceding description, the amplification factor was increased when the level of the received signal $V_2$ from the receiver 6 decreased. Conversely, the amplification factor is decreased when the received signal $V_2$ increases. Thus, any change in the level of received signal $V_2$ causes a change in the amplification factor so as to maintain the average value signal $V_{31}$ constant.

In FIG. 2, the timing controller 1 is shown as comprising a microcomputer 20 and separate monostable multivibrators 1a–1c. However, it is possible for all of the control signals $P_1$–$P_3$ to be generated by a single microcomputer, or to employ separate timer IC's for each signal. Furthermore, the reference signal generator 11 is shown as being an analog device which generates a triangular wave having a slope determined by an RC constant. However, a digital circuit or a microcomputer can be employed for the reference signal generator, and the reference signal $V_4$ can be a signal which changes in a step-wise manner.

In the embodiment of FIG. 1, the amplified signal $V_3$ is input directly into the comparator 12. However, it is possible to dispose a differentiator between the amplification circuit 7 and the comparator 12 for differentiating the amplified signal $V_3$. In this case, an obstacle 5 can be detected by comparing the amplified signal $V_3$ with the reference signal $V_4$.

As shown by line 5(d), the amplified signal $V_3$ which is averaged by the averaging circuit 8 includes a component $V_{3b}$ due to obstacles 5 superimposed upon a component $V_3$, due to the road surface itself. Ideally, the average value signal $V_{31}$ is the average of only component $V_3$, and indicates the smoothness of the road surface 4 in the absence of obstacles. When obstacles 5 occur infrequently, the average value signal $V_{31}$ will not be greatly affected by the components $V_{3b}$ due to obstacles 5, and the ideal condition is approximated. However, when obstacles 5 are frequently encountered, the average value signal $V_{31}$ will be greatly influenced by the components $V_{3b}$ due to obstacles. Namely, the average value signal $V_{31}$ will tend to increase compared to when obstacles 5 are infrequent, in spite of no change in the smoothness of the road surface 4. To prevent such an increase in the average value signal $V_{31}$, the amplification factor controller 10 will suppress the amplification factor. The decrease in the amplification factor reduces the level of the peaks in the amplified signal $V_3$. As a result, the comparator 12 can not detect all the components $V_{3b}$ due to obstacles in the amplified signal $V_3$, and the accuracy of obstacle sensing is decreased.

Figure 6:
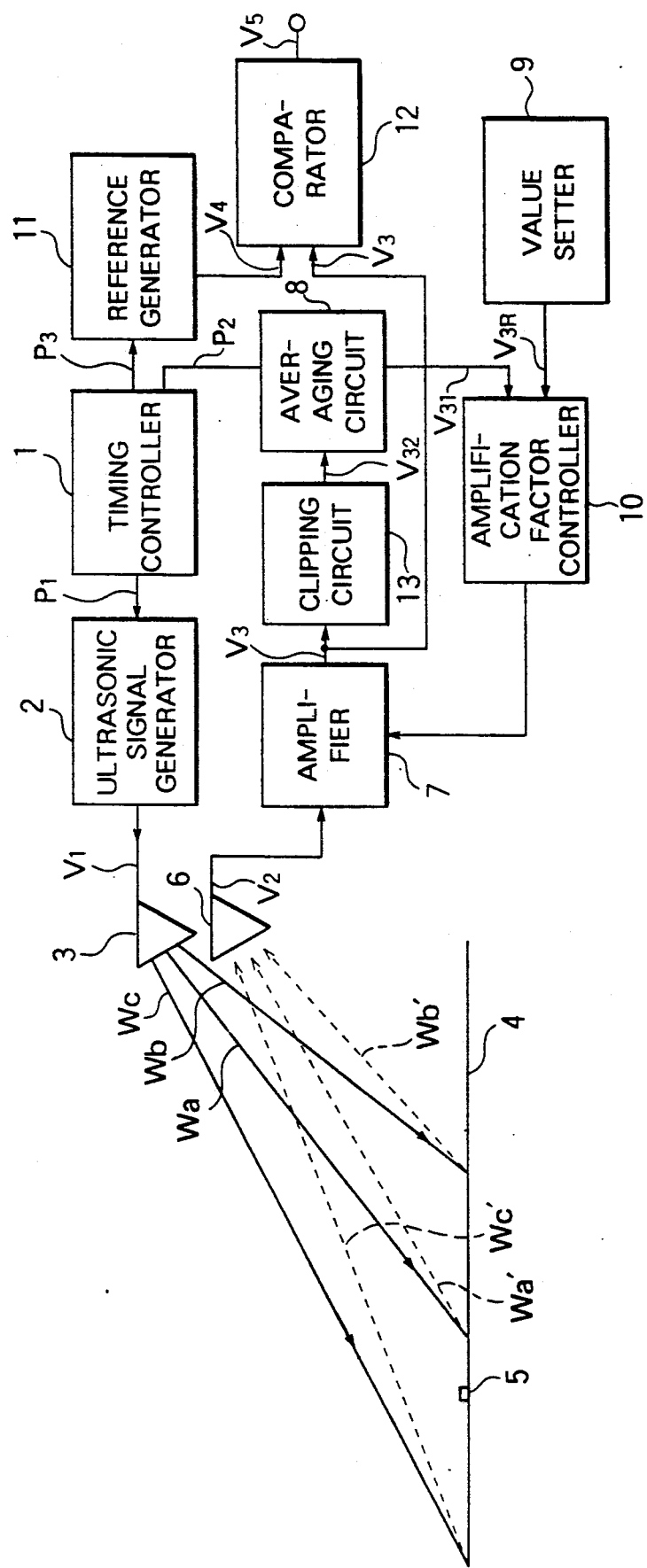
FIG. 6 is a block diagram of a second embodiment of the present invention.

This problem is solved in a second embodiment of the present invention, which is schematically illustrated in the form of a block diagram in FIG. 6. The structure of this embodiment is similar to that of the previous embodiment but it further comprises a clipping circuit 13 disposed between the amplification circuit 7 and the averaging circuit 8. The clipping circuit 13 receives the amplified signal $V_3$ from the amplification circuit 7 and clips the amplified signal $V_3$ to generate a clipped signal $V_{32}$, which is input to the averaging circuit 8. The averaging circuit 8 then generates an average value signal $V_{31}$ indicating the average value of the clipped signal $V_{32}$.

Figure 7:
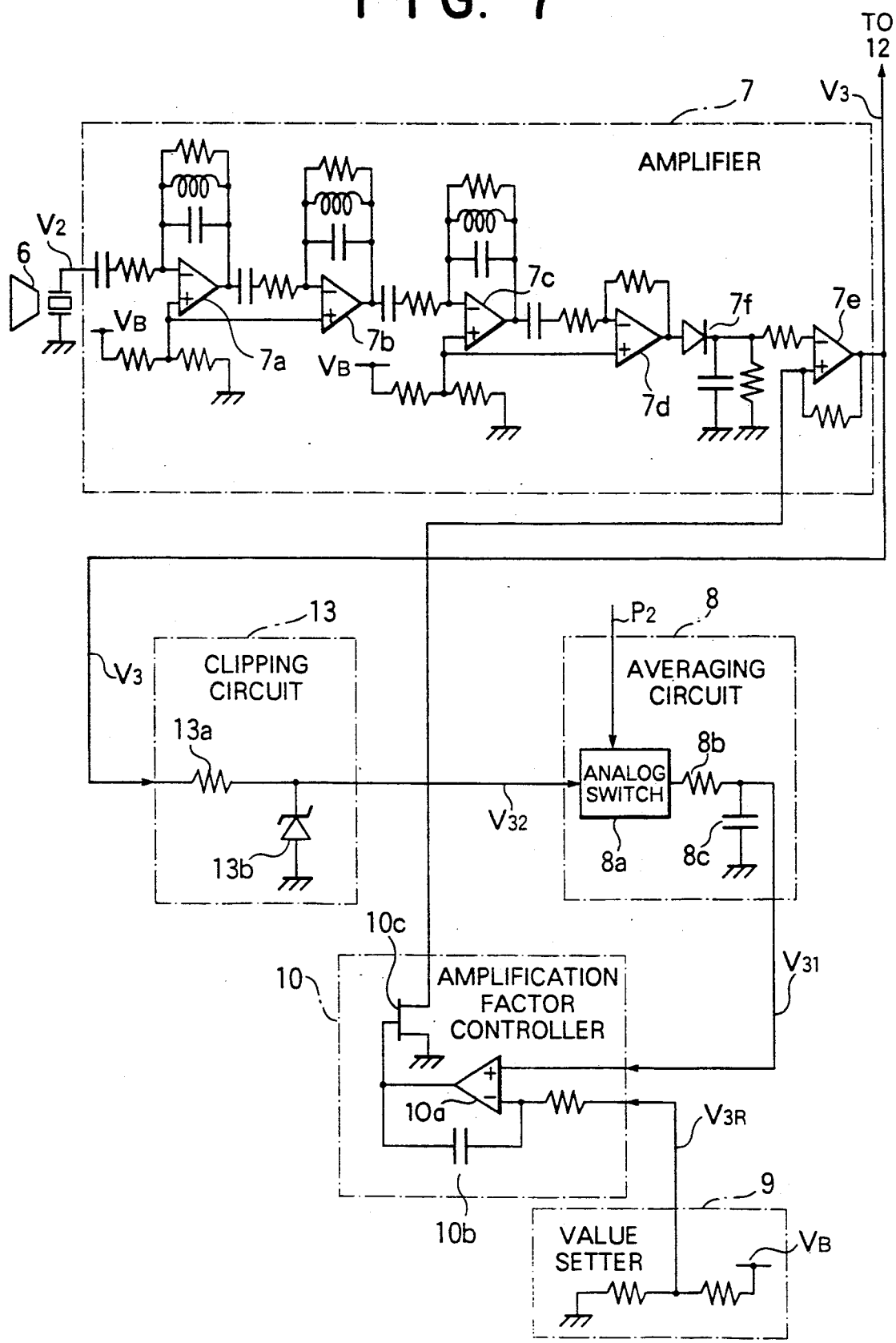
FIG. 7 is a circuit diagram of the amplification circuit, the clipping circuit, the averaging circuit, the value setter, and the amplification factor controller of FIG. 6.

FIG. 7 is a circuit diagram illustrating an example of the structure of the clipping circuit 13 as connected between the amplification circuit 7 and the averaging circuit 8. It includes a resistor 13a connected in series between the output terminal of op-amp 7e of the amplification circuit 7 and the analog switch 8a of the averaging circuit 8. The cathode of a Zener diode 13b is connected to the resistor 13a and the anode of the Zener diode 13b is grounded. The voltage at the junction of the resistor 13a and the Zener diode 13b is a clipped voltage $V_{32}$, which is provided to the analog switch 8a of the averaging circuit. The structure of the amplification circuit 7, the averaging circuit 8, the reference value setter 9, and the amplification factor controller 10 in FIG. 7 are the same as in the example of FIG. 2. The Zener diode 13b is selected so that the clipped voltage $V_{32}$ will not exceed a prescribed clipping voltage Vc. The clipping voltage $C_c$ approximately corresponds to the peak level of component $V_{3a}$, i.e., to the peak level of the component due to the reflected waves from the road surface 4.

Figure 8:
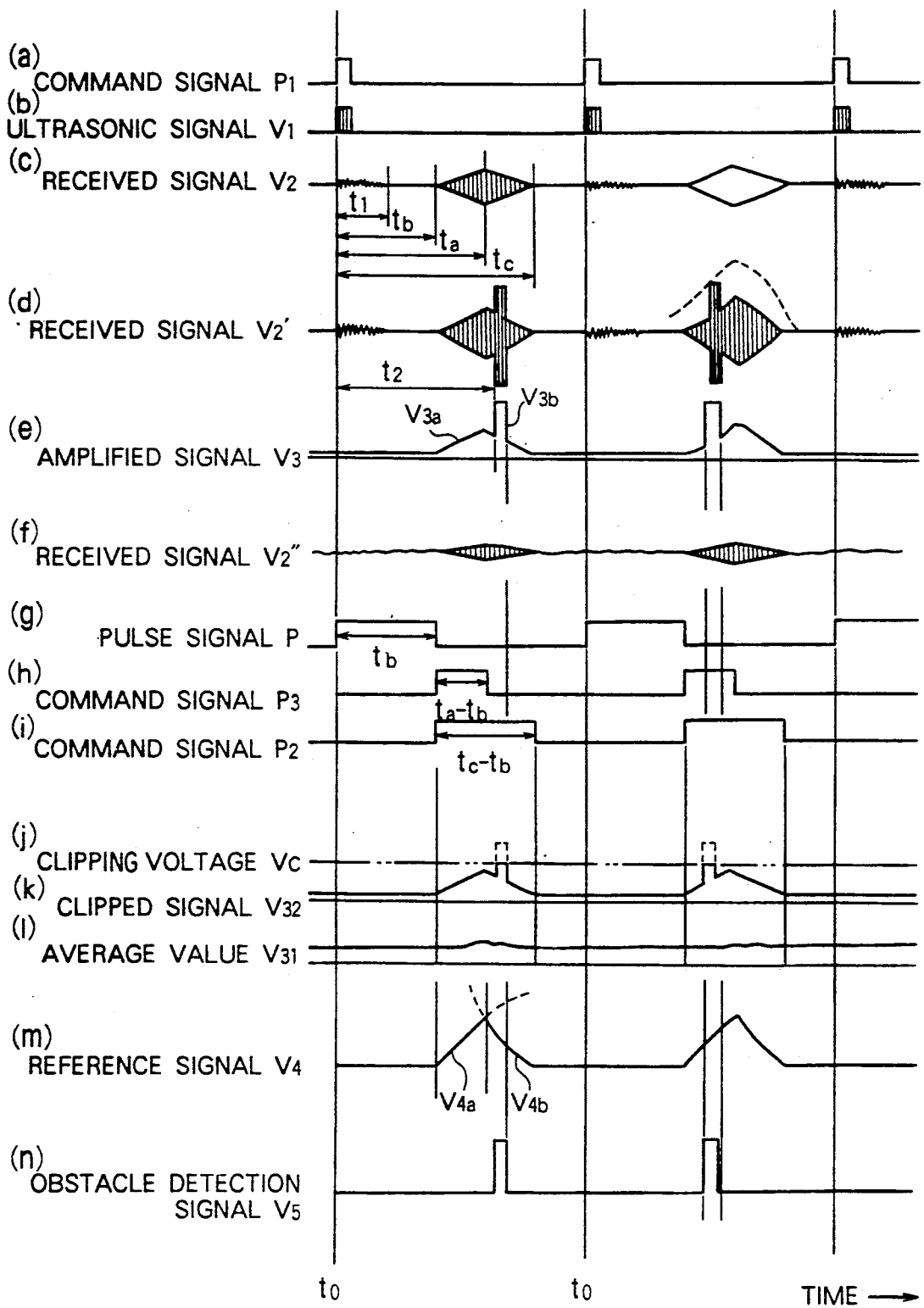
FIG. 8 is a wave form diagram for explaining the operation of the embodiment of the embodiment of FIG. 6.

FIG. 8 is a wave form diagram of the output signals of various portions of the embodiment of FIG. 7. The operation of this embodiment is similar to that of the embodiment of FIG. 1, and lines 8(a) through 8(j) of FIG. 8 are identical to the corresponding lines in FIG. 5. As shown by line 8(j), the amplified signal $V_3$ from the amplification circuit 7 is input to the clipping circuit and is clipped to a clipping voltage Vc to obtain a clipped voltage $V_{32}$. The averaging circuit 8 then generates an average value signal $V_{31}$ indicating the average of the clipped signal $V_{32}$, and the amplification factor controller 10 controls the amplification factor of the amplification circuit 7 so that the average value signal $V_{31}$ equals reference signal $V_{3R}$.

As a result, the effect of component $V_{3b}$ due to obstacle 5 on the average value signal $V_{31}$ is suppressed, and level of average value signal $V_{31}$ closely approximates the average value of the component $V_{3a}$ of the amplified signal $V_3$ due to the waves reflected from the road surface 4. Therefore, even when the vehicle is traveling on a road surface on which many obstacles 5 are present, the obstacles 5 can be accurately detected.

Figure 9:
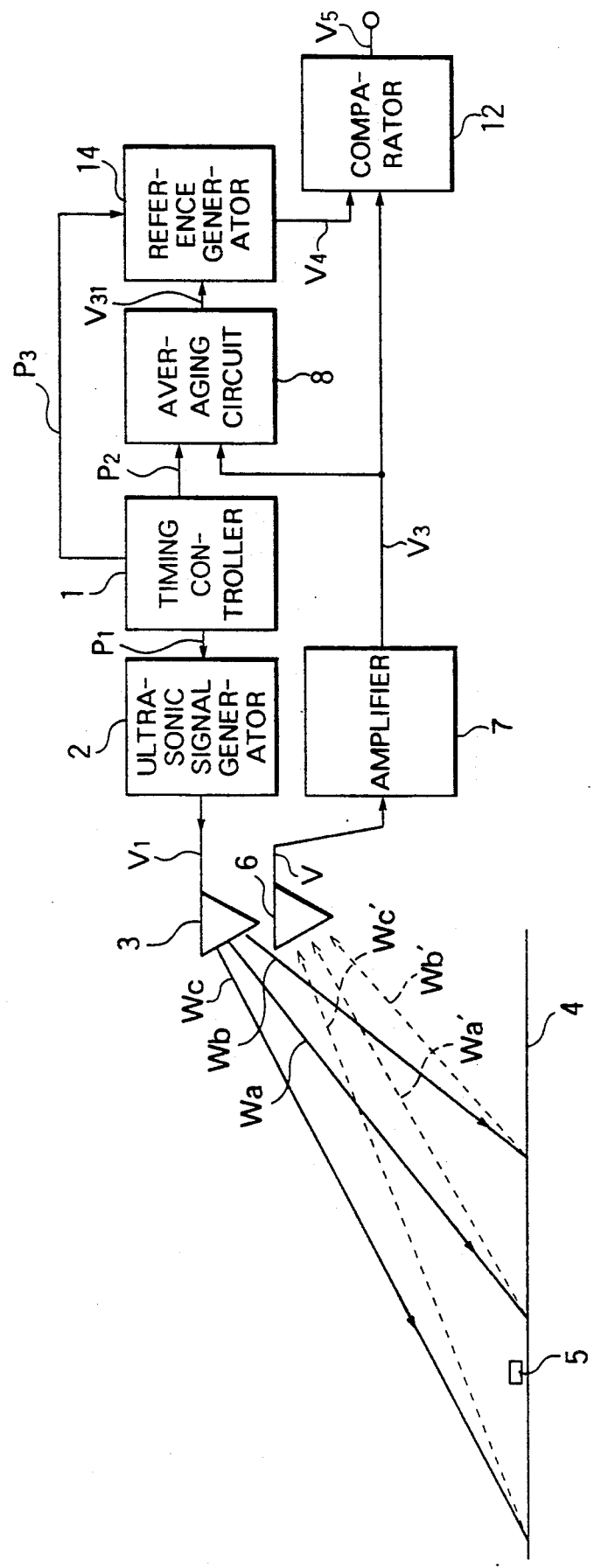
FIG. 9 is a block diagram of a third embodiment of the present invention.

In the preceding embodiments, a stable ratio between the average value signal $V_{31}$ and the average of the reference signal $V_4$ is attained by adjusting the amplification factor of the amplification circuit 7. However, it is instead possible to let the average value signal $V_{31}$ vary and to adjust the reference signal $V_4$ in accordance with variations in the average value signal $V_{31}$. FIG. 9 is a block diagram of a third embodiment of the present invention which operates in this manner. The structure of this embodiment is similar to that of the embodiment of FIG. 1, but the reference value setter 9 and the amplification factor controller 10 of FIG. 1 are not employed. Furthermore, the reference signal generator 11 of FIG. 1, which generates a reference signal having a constant peak value, has been replaced by a reference signal generator 14 which generates a reference signal $V_4$ having an average value which varies in magnitude in accordance with the level of the average value signal $V_{31}$ generated by the averaging circuit 8. The reference signal $V_4$ is compared with an amplified signal $V_3$ by a comparator 12, which generates an obstacle detection signal V5.

Figure 10:
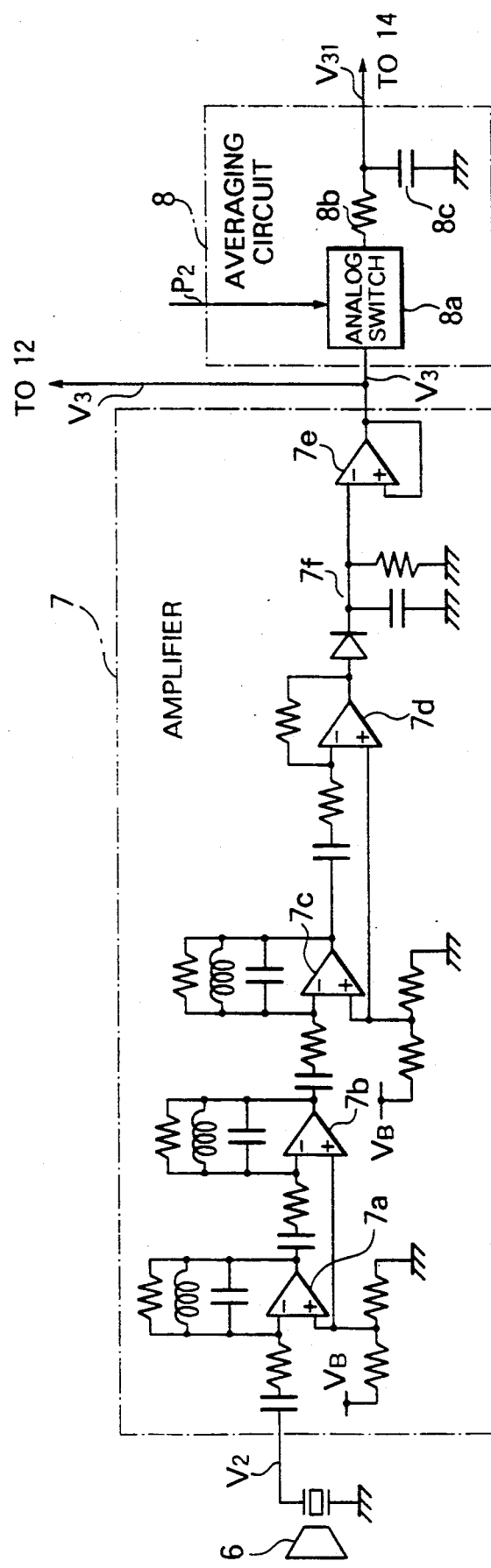
FIG. 10 is a circuit diagram of the amplification circuit and the averaging circuit of the embodiment FIG. 9.

FIG. 10 is a circuit diagram of an example of the amplification circuit 7 and the averaging circuit 8 of this embodiment. The averaging circuit 8 is identical to that shown in FIG. 4, while the amplification circuit 7 of FIG. 10 differs from that of FIG. 4 only in that the fifth-stage amplifier 7e has a constant amplification factor rather than a variable one.

Figure 11:
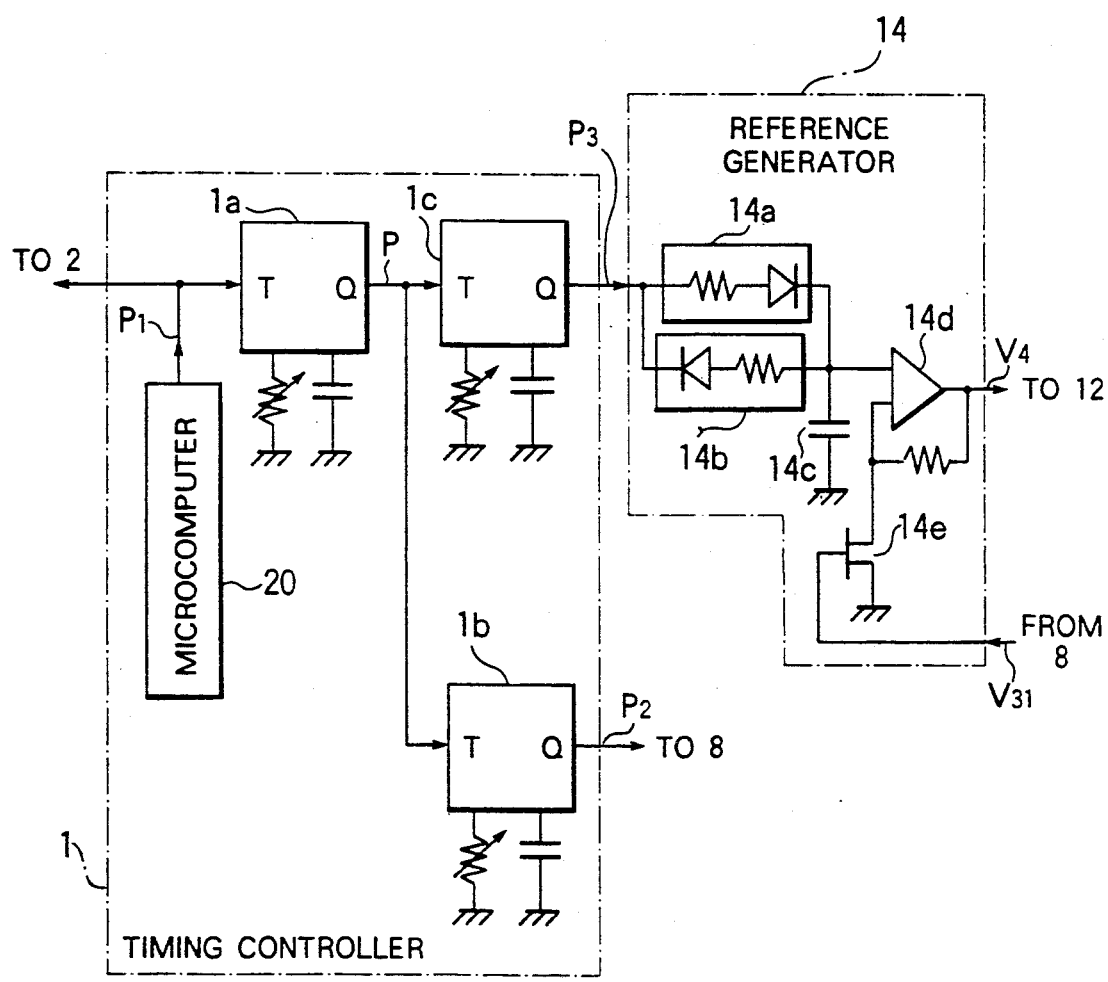
FIG. 11 is a circuit diagram of the timing controller and the reference signal generator of FIG. 9.

FIG. 11 is a circuit diagram showing a example of the timing controller 1 and the reference signal generator 14 of the embodiment of FIG. 9. The timing controller 1 is identical to the timing controller 1 of Figure 2. The reference signal generator 14 includes a charging circuit 14a, a discharging circuit 14b, and a capacitor 14c corresponding to the charging circuit 9a, the discharging circuit 9b, and the capacitor 9c of FIG. 2. The anode of the capacitor 9c is connected to one of the input terminals of an op-amp 14d. The other input terminal of the op-amp 14d is connected to the output terminal of the op-amp 14d through a resistor and to one of the terminals of an FET 14e, the other terminal of which is grounded. The gate of the FET 14e is connected to the averaging circuit 8 and receives the average value signal $V_{31}$ as a control signal. The op-amp 14d amplifies the voltage across the capacitor 14c by a factor determined by the gate voltage of the FET 14e and provides the amplified voltage to the comparator 12 as a reference signal $V_4$. The higher the average value signal $V_{31}$, the lower is the impedance of the FET 14e, so the higher is the amplification factor of the op-amp 14d.

Figure 12:
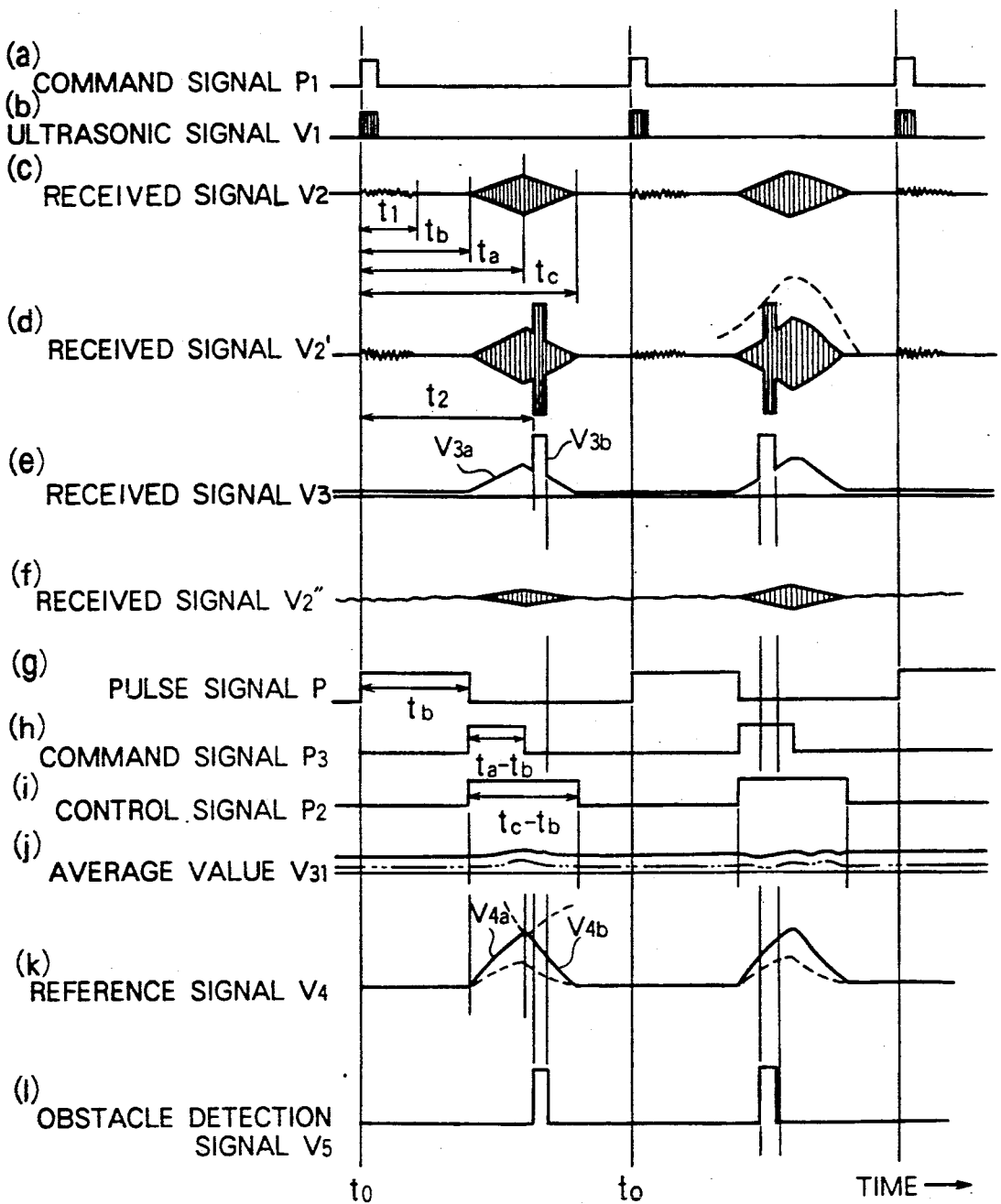
FIG. 12 is a wave form diagram for explaining the operation of the embodiment of FIG. 9.

FIG. 12 illustrates the wave forms of the output signals of various portions of the embodiment of FIG. 9. The timing controller 1 generates control signal P1 (line 12(a)), in response to which the ultrasonic signal generator 2 generates ultrasonic signal $V_1$ (line 12(b)), which is input to the ultrasonic transmitter 3. The ultrasonic transmitter 3 generates ultrasonic waves which are reflected from the road surface 4. The ultrasonic receiver 6 receives the reflected waves and generates receives signal $V_2$ (line 12(c)) when no obstacle is present, and generates received signal $V_2'$ (line 12 (d)) when an obstacle 5 is present. The received signal $V_2$ or $V_2'$ is processed and amplified by the amplification circuit 7 and input to the averaging circuit 8 and the comparator 12 as amplified signal $V_3$. The averaging circuit 8 calculates the average of the amplified signal $V_3$ and generates an average value signal $V_{31}$ (line 12(j)). The average value signal $V_{31}$ is input to the reference signal generator 14, which generates a corresponding reference signal $V_4$ (line 12(k)) which is input to the comparator 12 for comparison with the amplified signal $V_3$.

When the received signal has a relatively high level, such as the signals of lines 12(c) and 12(d), the average value $V_{31}$ has a relatively high value, as shown by the solid curve in line 12(j), so the op-amp 14d has a high amplification factor, and the reference signal $V_4$ generated by the reference signal generator 14 has a relatively high magnitude, as shown by the solid curve in line 12(k).

However, when the received signal has a low level, such as received signal $V_2''$ of line 12(f), the average value signal $V_{31}$ decreases, as shown by the dashed curve in line 12(j). If the level of the reference signal $V_4$ remained unchanged, it would be impossible to detect components due to obstacles in the received signal $V_2''$.

In the present embodiment, to avoid this problem, the peak value (and therefore the average value) of the reference signal $V_4$ is made to vary in accordance with the average value signal $V_{31}$ so that the ratio of the average of the reference signal $V_4$ to the average value signal $V_{31}$ remains constant. For example, when the average value signal $V_{31}$ decreases, the amplification factor of op-amp 14d also decreases, so the peak value of reference signal $V_4$ decreases, as shown by the dashed curve in line 12(k), in accordance with the decrease in the average value signal $V_{31}$. Each time the level of the amplified signal $V_3$ exceeds the level of the reference signal $V_4$, the obstacle detection signal $V5$ has a high level. As in the preceding embodiments, the obstacle detection signal $V5$ is provided to a suspension controller, which adjusts the hardness of the vehicle suspension so as to decrease the shock when the vehicle rolls over the obstacle 5.

Figure 13:
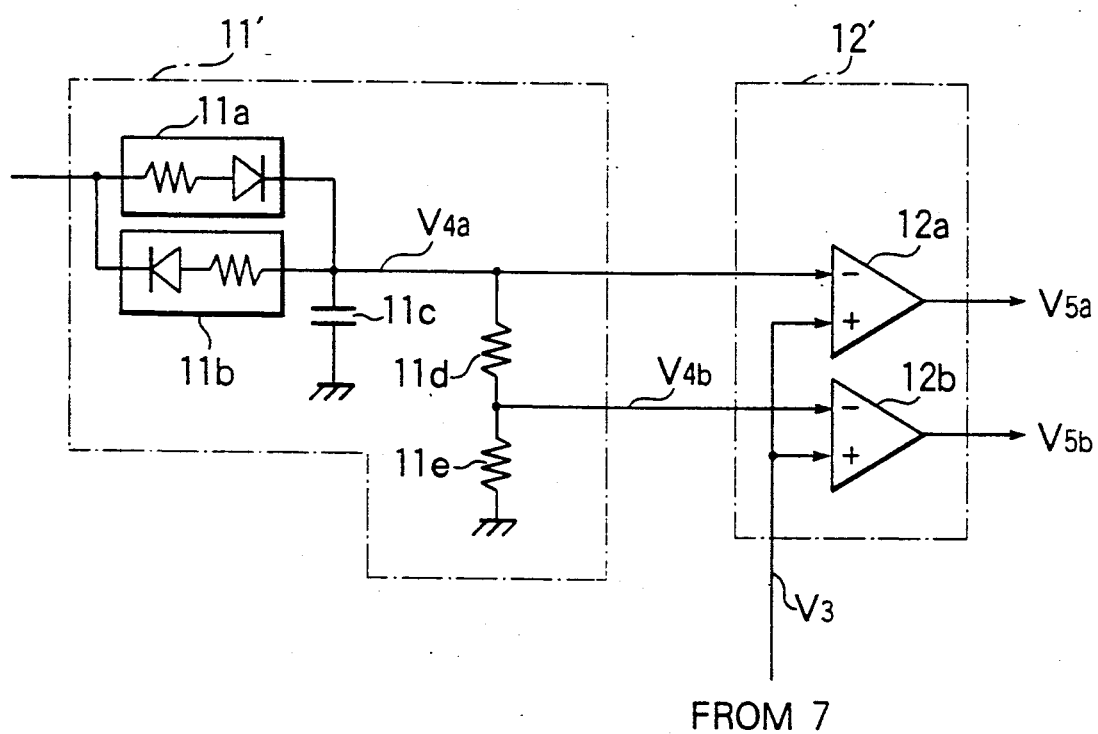
FIG. 13 is a circuit diagram of the reference signal generator and the comparator of a fourth embodiment of the present invention.

The obstacle sensors of the preceding embodiments indicate the presence or absence of an obstacle 5 but not the size of the obstacle. However, any of the preceding embodiments can be easily adapted so as to generate an obstacle detection signal indicative of the size of an obstacle. FIG. 13 illustrates the structure of a reference signal generator 11' and a comparator 12' of a fourth embodiment of the present invention which can generate an obstacle detection signal indicating the size of an obstacle. The reference signal generator 11' and the comparator 12' of FIG. 13 are employed in place of the reference signal generator 11 and the comparator 12 of FIG. 1. The structure of this embodiment is otherwise identical to that of the embodiment of FIG. 1. Like the reference signal generator 11 of FIG. 1, the reference signal generator 11' of FIG. 13 includes a charging circuit 11a, a discharging circuit 11b, and a capacitor 11c. A voltage divider comprising two resistors 11d and 11e is connected in parallel with the capacitor 11c between the charging circuit 11a and ground. The voltage across the capacitor 11c constitutes a first reference signal $V_{4a}$, and the voltage at the junction of resistors 11d and 11e constitutes a second reference signal $V_{4b}$.

The comparator 12' includes first and second op-amps 12a and 12b. The non-inverting input terminal of each op-amp is connected to the output of an amplification circuit 7. The inverting input terminal of op-amp 12a is connected to the junction of resistor 11d and capacitor 11c, and the inverting input terminal of op-amp 12b is connected to the junction of resistors 11d and 11e. Accordingly, op-amp 12a compares the first reference signal $V_{4a}$ with the amplified signal $V_3$ from the amplification circuit 7, and op-amp 12b compares the second reference signal $V_{4b}$ with the amplified signal $V_3$. The output of op-amp 12a is a first obstacle detection signal $V_{5a}$ having a high level when the amplified signal $V_3$ exceeds the first reference signal $V_{4a}$, and the output of op-amp 12b is a second obstacle detection signal $V_{5b}$ having a high level when the amplified signal $V_3$ exceeds the second reference signal $V_{4b}$.

Figure 14:
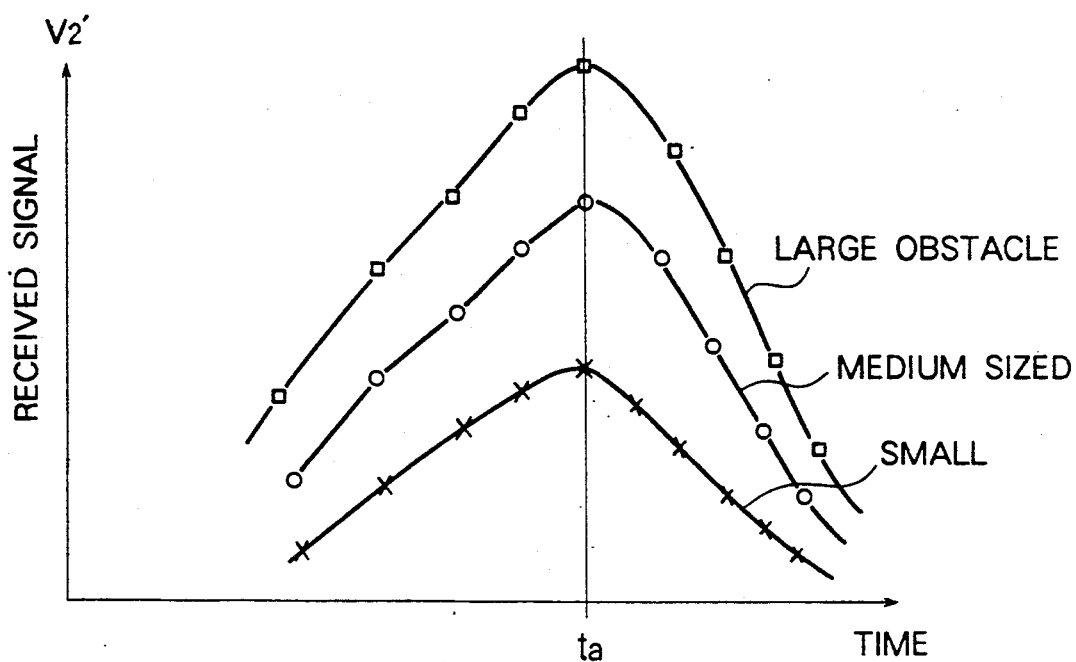
FIG. 14 is graph of the level of the received signal as a function of time for obstacles of different sizes.
Figure 15:
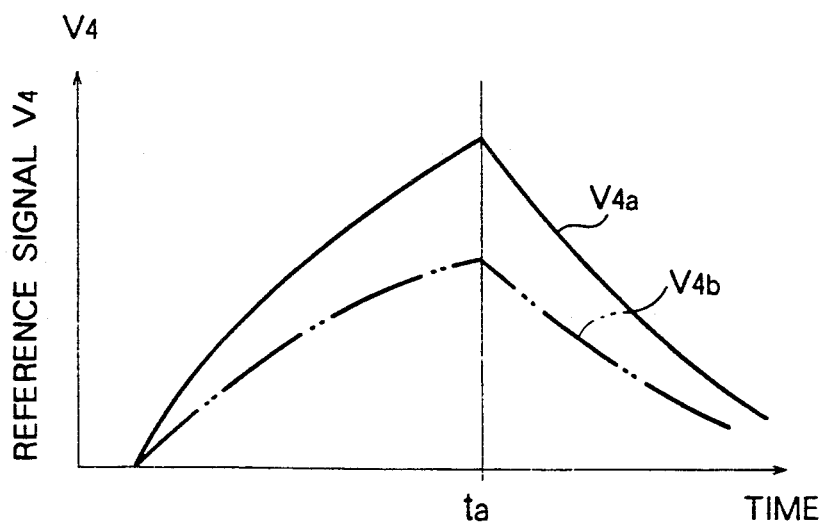
FIG. 15 is a graph of the reference signal as a function of time for the embodiment of FIG. 13.

FIG. 14 illustrates the wave form of the received signal $V_2'$ for a large sized obstacle, a medium sized obstacle, and a small obstacle. Clearly, the larger the obstacle, the larger is the magnitude of the received signal $V_2'$ (and of the amplified signal $V_3$, as well). By comparing the amplified signal $V_3$ with a plurality of reference signals $V_{4a}$ and $V_{4b}$, the size of the obstacle can be roughly determined. FIG. 15 shows the wave forms of the first and second reference signals $V_{4a}$ and $V_{4b}$ generated by the reference signal generator 11'. The wave forms of the two reference signals are similar in shape but of different magnitude.

When there is no obstacle 5 present on the road surface 4 or the obstacle 5 is small, the amplified signal $V_3$ will have a low level and will not exceed either reference signal $V_{4a}$ or $V_{4b}$, so both obstacle detection signals $V_{5a}$ and $V_{5b}$ will have a low level. If a medium sized obstacle 5 is present on the road surface 4, the amplified signal $V_3$ will exceed the second reference signal $V_{4b}$ but not the first reference signal $V_{4a}$, so only the second obstacle detection signal $V_{5b}$ will have a high level. If a large size obstacle 5 is present on the road surface 5, the amplified signal $V_3$ will exceed both the first reference signal $V_{4a}$ and the second reference signal $V_{4b}$, so both of op-amps 12a and 12b generate obstacle detection signals $V_{5a}$ and $V_{5b}$ having high levels.

The obstacle detection signals $V_{5a}$ and $V_{5b}$ are supplied to an unillustrated suspension controller, which adjusts the suspension hardness in accordance with which of obstacle detection's signals $V_{5a}$ and $V_{5b}$, has a high level. This embodiment is particularly for enabling the suspension to cope with sharp discontinuities in the road surface 4, such as potholes. Vibrations can be absorbed more effectively by decreasing the stiffness of the suspension in accordance with the magnitude of the obstacle. If the discontinuity, e.g., the depth of a pothole is so large that the suspension can not effectively absorb the shock, the suspension can be stiffened to prevent damage to the suspension.

The operation of this embodiment is otherwise similar to that of the embodiment of FIG. 1. Although the preceding description was made with respect to an embodiment similar in structure to the embodiment of FIG. 1, components similar to the reference signal generator 11' and the comparator 12' of FIG. 13 can also be employed in the embodiments of FIGS. 6 and 9 to enable those embodiments to indicate the size of an obstacle.

The number of reference signals and obstacle detection signals is not limited to the number shown in FIG. 13. By increasing the number of resistors in the voltage divider of the reference signal generator 11', any desired number of reference signals can be generated, and a corresponding number of op-amps can be provided in the comparator 12' to generate an obstacle detection signal corresponding to each reference signal. If the number of reference signals and obstacle detection signals is increased, the size of an obstacle can be determined with great accuracy, and fine control of the vehicle suspension can be performed.

In each of the above-described embodiments, the ultrasonic waves are transmitted intermittently. However, it is also possible to employ an ultrasonic wave generator which generates ultrasonic waves continuously. In this case, the average value of the amplified signal $V_3$ can be determined at a desired sampling period.

Furthermore, in the above-described embodiments, the reference signal $V_4$ has a triangular wave form, but other wave forms can be used instead.

What is claimed is:

1. An ultrasonic obstacle sensor for an automotive vehicle comprising:
   an ultrasonic transmitter for generating ultrasonic waves;
   an ultrasonic receiver for receiving ultrasonic waves and generating a corresponding signal;
   an amplifier for amplifying the signal from the ultrasonic receiver by an amplification factor and generating an amplified signal;
   an averager for generating an average signal indicating the average of the amplified signal;
   a reference signal generator for generating a reference signal;
   a comparator for comparing the reference signal with the amplified signal and generating an obstacle detection signal indicating when the amplified signal exceeds the reference signal; and
   control means for varying at least one of the magnitude of the reference signal and the amplification factor of the amplifier in accordance with variations in the average signal.

2. An obstacle sensor as claimed in claim 1, wherein the control means comprises means for varying at least one of the magnitude of the reference signal and the amplification factor of the amplifier so that the ratio of the average signal to the average of the reference signal is constant.

3. An obstacle sensor as claimed in claim 1, wherein:
   the control means comprises an amplification factor controller responsive to the average signal for controlling the amplification factor of the amplifier so as to maintain the average signal equal to a prescribed value.

4. An obstacle sensor as claimed in claim 1, wherein:
   the control means comprises means responsive to the average signal for controlling the reference signal generator so that the average of the reference signal is a constant multiple of the average signal.

5. An obstacle sensor as claimed in claim 1, wherein the vehicle is disposed on a surface, and the ultrasonic transmitter is mounted on the vehicle so as to transmit ultrasonic waves diagonally forwards of the vehicle towards the surface.

6. An obstacle sensor as claimed in claim 1, wherein the ultrasonic transmitter comprises means for generating ultrasonic waves intermittently.

7. An obstacle sensor as claimed in claim 1, further comprising a voltage clipper connected between the amplifier and the averager for clipping the amplified signal to a prescribed voltage and providing the clipped signal to the averager.

8. An obstacle sensor as claimed in claim 1, wherein the reference signal has a triangular wave form.

9. An obstacle sensor as claimed in claim 1, wherein the reference signal generator comprises means for generating a plurality of reference signals having different magnitudes, and the comparator comprises means for comparing the amplified signal with each of the reference signals and generating an obstacle detection signal indicating the result of each comparison.

10. An ultrasonic obstacle sensor for an automotive vehicle comprising:
    an ultrasonic transmitter for intermittently generating ultrasonic waves, the ultrasonic transmitter being mounted on the vehicle so as to transmit the ultrasonic waves diagonally forward of the vehicle towards a surface on which the vehicle is disposed;
    an ultrasonic receiver for receiving ultrasonic waves reflected from the surface and generating a corresponding signal;
    an adjustable amplifier for amplifying the signal from the ultrasonic receiver and generating an amplified signal;
    an averager for generating an average signal indicating the average of the amplified signal;
    a reference signal generator for generating a reference signal;
    a comparator for comparing the reference signal with the amplified signal and generating an obstacle detection signal indicating when the amplified signal exceeds the reference signal; and
    an amplification factor controller responsive to the average signal for controlling the amplification factor of the amplifier so that the average signal has a constant, prescribed value.

11. An ultrasonic obstacle sensor for an automotive vehicle comprising:
    an ultrasonic transmitter for intermittently generating ultrasonic waves, the ultrasonic transmitter being mounted on the vehicle so as to transmit the ultrasonic waves diagonally forward of the vehicle towards a surface on which the vehicle is disposed;
    an ultrasonic receiver for receiving ultrasonic waves reflected from the surface and generating a corresponding signal;
    an amplifier for amplifying the signal from the ultrasonic receiver and generating an amplified signal;
    an averager for generating an average signal indicating the average of the amplified signal;
    a reference signal generator for generating a reference signal;
    a comparator for comparing the reference signal with the amplified signal and generating an obstacle detection signal indicating when the amplified signal exceeds the reference signal; and
    means for controlling the reference signal generator so that the ratio of the average of the reference signal to the average signal is constant.

12. A method of detecting obstacles on a road surface in front of an automotive vehicle comprising the steps of:
    intermittently generating ultrasonic waves diagonally forwards of the vehicle towards the road surface;
    receiving ultrasonic waves reflected from the road surface and generating a corresponding received signal;
    amplifying the received signal by an amplification factor to obtain an amplified signal;

averaging the amplified signal to obtain an average signal;

generating a reference signal for comparison with the amplified signal;

comparing the reference signal with the amplified signal and generating an obstacle detection signal indicating when the amplified signal exceeds the reference signal; and controlling at least one of the reference signal generator and the amplification factor so that the ratio of the average signal to the average of the reference signal is constant.

* * * * *